United States Patent
Zhang

(10) Patent No.: US 10,503,930 B2
(45) Date of Patent: Dec. 10, 2019

(54) NDM FILE PROTECTION METHOD AND APPARATUS

(71) Applicant: Huawei Technologies Co., Ltd., Shenzhen (CN)

(72) Inventor: Dacheng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 15/332,421

(22) Filed: Oct. 24, 2016

(65) Prior Publication Data

US 2017/0039393 A1 Feb. 9, 2017

Related U.S. Application Data

(63) Continuation of application No. PCT/CN2015/075481, filed on Mar. 31, 2015.

(30) Foreign Application Priority Data

Apr. 25, 2014 (CN) .......................... 2014 1 0173014

(51) Int. Cl.
*G06F 21/64* (2013.01)
*G06F 16/17* (2019.01)
*H04L 29/06* (2006.01)

(52) U.S. Cl.
CPC .......... *G06F 21/64* (2013.01); *G06F 16/1734* (2019.01); *H04L 29/06* (2013.01)

(58) Field of Classification Search
CPC ....... G06F 21/64; G06F 16/1734; H04L 29/06
See application file for complete search history.

(56) References Cited

U.S. PATENT DOCUMENTS

| 2001/0036271 | A1* | 11/2001 | Javed ................. H04N 7/17327 |
| | | | 380/217 |
| 2006/0015731 | A1* | 1/2006 | Lakshmi Narayanan ................... |
| | | | H04L 9/3242 |
| | | | 713/176 |
| 2008/0229099 | A1* | 9/2008 | Kim ..................... G06F 21/6209 |
| | | | 713/160 |
| 2009/0024827 | A1 | 1/2009 | Davis |
| 2010/0082994 | A1 | 4/2010 | Wang et al. |
| 2010/0131770 | A1* | 5/2010 | Torrubia ................. G06F 21/10 |
| | | | 713/176 |
| 2014/0075197 | A1* | 3/2014 | Alrabady .................. G06F 8/65 |
| | | | 713/176 |

(Continued)

FOREIGN PATENT DOCUMENTS

| CN | 101203025 A | 6/2008 |
| CN | 101320408 A | 12/2008 |

(Continued)

OTHER PUBLICATIONS

Open Networking Foundation, "OpenFlow Switch Specification," Version 1.3.4 (Protocol version 0x04), Mar. 27, 2014, 171 pages.

*Primary Examiner* — Michael R Vaughan
(74) *Attorney, Agent, or Firm* — Slater Matsil, LLP

(57) ABSTRACT

Embodiments of the present application provide an NDM file protection method and apparatus. The method includes: a sending device generates integrity information of an NDM file, and sends the NDM file and the integrity information of the NDM file to a receiving device, so that the receiving device verifies, according to the integrity information, whether the NDM file is tampered with.

16 Claims, 3 Drawing Sheets

A sending device generates integrity information of an NDM file — S101

The sending device sends the NDM file and the integrity information of the NDM file to a receiving device, so that the receiving device verifies, according to the integrity information, whether the NDM file is tampered with — S102

(56) References Cited

U.S. PATENT DOCUMENTS

2016/0277373 A1\* 9/2016 Murray ................ H04L 63/061

FOREIGN PATENT DOCUMENTS

| CN | 101436141 A | 5/2009 |
|----|-------------|--------|
| CN | 101931536 A | 12/2010 |
| CN | 103927497 A | 7/2014 |
| EP | 1443381 A2 | 1/2004 |

\* cited by examiner

NDM FILE PROTECTION METHOD AND APPARATUS

CROSS-REFERENCE TO RELATED APPLICATIONS

This application is a continuation of International Application No. PCT/CN2015/075481, filed on Mar. 31, 2015, which claims priority to Chinese Patent Application No. 201410173014.3, filed on Apr. 25, 2014. The disclosures of the aforementioned applications are hereby incorporated by reference in their entireties.

TECHNICAL FIELD

Embodiments of the present application relate to communications technologies, and in particular, to an NDM file protection method and apparatus.

BACKGROUND

In the communications field, OpenFlow is a protocol for controlling interactions between a controller and a switch in an architecture in which control is separated from forwarding. A switch for switching data according to the OpenFlow protocol is an OpenFlow switch, and interchangable OpenFlow negotiable datapath models (NDM) are files for describing functions of an OpenFlow switch.

A standardization organization or an enterprise publishes an NDM file, and the NDM file describes a function requirement of the standardization organization or enterprise for the OpenFlow switch. A device provider develops a corresponding OpenFlow switch according to the description of the NDM file, so that the developed OpenFlow switch has a function described in the NDM file.

The NDM file may be easily tampered with in a network transmission process. However, in the prior art, a receiving device cannot determine, according to content of the NDM file, whether the NDM file is tampered with in the transmission process, resulting in low security of the NDM file.

SUMMARY

Embodiments of the present application provide an NDM file protection method and apparatus to improve security of an NDM file.

According to one aspect, an embodiment of the present application provides an NDM file protection method. The method includes generating, by a sending device, integrity information of an NDM file. The method also includes sending, by the sending device, the NDM file and the integrity information of the NDM file to a receiving device, so that the receiving device verifies, according to the integrity information, whether the NDM file is tampered with.

According to another aspect, an embodiment of the present application provides an NDM file protection method. The method includes receiving, by a receiving device, an NDM file and integrity information of the NDM file that are sent by a sending device. The method also includes verifying, by the receiving device according to the integrity information, whether the NDM file is tampered with.

According to another aspect, an embodiment of the present application provides a sending device. The sending device includes a generating module, configured to generate integrity information of an NDM file. The sending device also includes a sending module, configured to send the NDM file and the integrity information of the NDM file to a receiving device, so that the receiving device verifies, according to the integrity information, whether the NDM file is tampered with.

According to another aspect, an embodiment of the present application provides a receiving device. The receiving device includes a receiving module, configured to receive an NDM file and integrity information of the NDM file that are sent by a sending device. The receiving device also includes a verifying module, configured to verify, according to the integrity information, whether the NDM file is tampered with.

According to another aspect, an embodiment of the present application provides an NDM file protection system, including the sending device and the receiving device.

According to the NDM file protection method and apparatus provided by the embodiments of the present application, integrity information of an NDM file is sent to a receiving device, so that the receiving device can verify, according to the integrity information, whether the NDM file is tampered with, thereby enhancing security of the NDM file.

DETAILED DESCRIPTION OF ILLUSTRATIVE EMBODIMENTS

Figure 1:
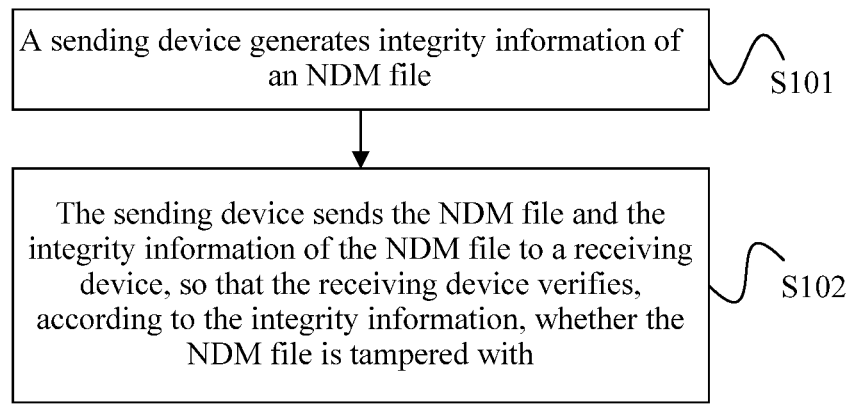
FIG. 1 is a flowchart of an NDM file protection method according to an embodiment of the present application.

FIG. 1 is a flowchart of an NDM file protection method according to an embodiment of the present application. Considering that an NDM file may be easily tampered with in a network transmission process, the embodiment of the present application provides a method applicable to NDM file protection. Specifically, Blocks of the NDM file protection method are as follows.

Block 101: A sending device generates integrity information of an NDM file.

The sending device generates the integrity information of the NDM file. The sending device may be a sending device of a publisher, such as a standardization organization or an enterprise, or may be a controller device (controller) used to control a switch. The integrity information generated by the sending device may be used to verify whether the NDM file is tampered with.

Block 102: The sending device sends the NDM file and the integrity information of the NDM file to a receiving device, so that the receiving device verifies, according to the integrity information, whether the NDM file is tampered with.

The sending device sends the NDM file and the integrity information of the NDM file to the receiving device. The integrity information of the NDM file may be added to content of the NDM file and sent together with the NDM file to the receiving device. The integrity information of the NDM file may also be combined with the NDM file into a folder, and the sending device sends the folder to the receiving device. The integrity information of the NDM file may also be sent immediately after sending the NDM file is completed. After receiving the NDM file and the integrity information of the NDM file, the receiving device verifies, according to the integrity information, whether the NDM file is tampered with.

In the embodiment of the present application, integrity information of an NDM file is sent to a receiving device, so that the receiving device can verify, according to the integrity information, whether the NDM file is tampered with, thereby enhancing security of the NDM file.

On a basis of the foregoing embodiment, when the sending device generates the integrity information of the NDM file, the sending device generates validity information of the NDM file, for the receiving device to determine a valid period of the NDM file.

That a sending device generates integrity information of an NDM file includes: the sending device generates signature information for the NDM file by using a first key and using a preset algorithm, where the signature information serves as the integrity information; or the sending device generates signature information for the NDM file and the validity information by using a first key and using a preset algorithm, where the signature information serves as the integrity information.

The sending device further generates the validity information of the NDM file, where the validity information is used by the receiving device to determine the valid period of the NDM file. For example, the valid period is from January 2013 to December 2013. If the receiving device received the NDM file in January 2014, which exceeds the valid period, the receiving device determines that the NDM file is invalid, and the receiving device does not support a function described in the NDM file.

That a sending device generates integrity information of an NDM file may be specifically: the sending device generates signature information of the NDM file for the content of the NDM file by using a first key such as a public key and using a preset algorithm such as a signature algorithm; or the sending device generates signature information for the content of the NDM file and the validity information of the NDM file by using a first key such as a public key and using a preset algorithm such as a signature algorithm. The signature information serves as the integrity information generated by the sending device.

In the embodiment of the present application, the validity information of the NDM file is sent to the receiving device, so that the receiving device can determine the valid period of the NDM file, thereby enhancing validity of the NDM file.

On a basis of the foregoing embodiment, the sending device sends a certificate and information about the preset algorithm to the receiving device, where the certificate includes a second key, where the second key is used to verify the integrity information.

In addition to the integrity information and validity information of the NDM file, the sending device further sends the information about the preset algorithm and the certificate to the receiving device. The sending device may send the signature information, the validity information (Valid Period), the information about the preset algorithm, and the certificate separately to the receiving device. In the embodiment of the present application, the sending device attaches the signature information, the validity information (Valid Period), the information about the preset algorithm, and the certificate to the content of the NDM file to form a signed NDM file. The signed NDM file is as follows:

```
NDM_metadata: {
...
"authority": "org.opennetworking.fawg",
"OF_protocol_version": "1.3.3+ext187+ext235",
"type": "TTPv1",
"name": "L2-L3-ACLs",
"version": "1.0.0",
"doc": ["TTP supporting L2 (unicast, multicast, flooding), L3 (unicast only),",
"and an ACL table."]
"Valid Period": "... to ..."
"Signature": "..."
"Algorithm": "..."
"Certificate": "..."
},
```

The information about the preset algorithm corresponds to the preset algorithm used by the sending device to generate the integrity information. The certificate includes the second key used by the receiving device to perform integrity verification. After receiving the signed NDM file, the receiving device verifies, according to the signed NDM file, the signature information in the signed NDM file, and the second key in the certificate, integrity of the NDM file by using the preset algorithm. Specifically, the signed NDM file, the signature information in the signed NDM file, and the second key in the certificate serve as input information of the preset algorithm. The input information is processed according to the preset algorithm and a verification result is output. If the verification result is success, it indicates that the NDM file is not tampered with; otherwise, the NDM file is tampered with. The preset algorithm used in the embodiment of the present application is an algorithm including both a signature algorithm and a verification algorithm in the prior art. Correspondingly, that the input information is processed according to the preset algorithm, and a verification result is output is also the prior art.

In addition, if the receiving device prestores the second key and the information about the preset algorithm, the signed NDM file may include only the signature information and the validity information (Valid Period). If the receiving device prestores the second key, the signed NDM file should include the signature information, the validity information (Valid Period), and the information about the preset algorithm. If the receiving device prestores the information about the preset algorithm, the signed NDM file should include the signature information, the validity information (Valid Period), and the second key. The sending device sends the second key to the receiving device by including the second key in the certificate, or sends the second key to the receiving device by directly attaching the second key to the NDM file.

In the embodiment of the present application, the sending device sends the information about the preset algorithm and the certificate to the receiving device, so that the receiving device accurately verifies whether the NDM file is tampered with.

Figure 2:
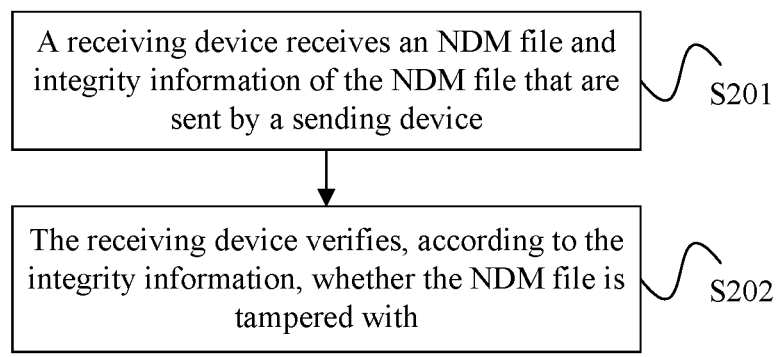
FIG. 2 is a flowchart of an NDM file protection method according to another embodiment of the present application.

FIG. 2 is a flowchart of an NDM file protection method according to another embodiment of the present application. Considering that an NDM file may be easily tampered with in a network transmission process, the embodiment of the present application provides a method applicable to NDM file protection. Specifically, the NDM file protection method includes the following.

Block 201: A receiving device receives an NDM file and integrity information of the NDM file that are sent by a sending device.

The sending device generates the integrity information of the NDM file, and sends the NDM file and the integrity information to the receiving device. The receiving device receives the NDM file and the integrity information of the NDM file that are sent by the sending device.

Block 202: The receiving device verifies, according to the integrity information, whether the NDM file is tampered with.

After receiving the NDM file and the integrity information of the NDM file, the receiving device verifies, according to the integrity information, whether the NDM file is tampered with.

In the embodiment of the present application, integrity information of an NDM file is sent to a receiving device, so that the receiving device can verify, according to the integrity information, whether the NDM file is tampered with, thereby enhancing security of the NDM file.

On a basis of the foregoing embodiment, the NDM file received by the receiving device includes validity information, where the validity information is information of the NDM file, generated by the sending device, and used by the receiving device to determine a valid period of the NDM file.

The integrity information is signature information that is generated by the sending device for the NDM file by using a first key and using a preset algorithm; or the integrity information is signature information that is generated by the sending device for the NDM file and the validity information by using a first key and using a preset algorithm.

The NDM file received by the receiving device further includes the validity information, where the validity information is used by the receiving device to determine the valid period of the NDM file. If the validity information of the NDM file received by the receiving device exceeds the valid period, the receiving device determines that the NDM file is invalid, and the receiving device does not support a function described in the NDM file.

The integrity information may be signature information of the NDM file, where the signature information of the NDM file is generated by the sending device for content of the NDM file by using a first key such as a public key and using a preset algorithm such as a signature algorithm; or the integrity information may be signature information, where the signature information is generated by the sending device for content of the NDM file and the validity information of the NDM file by using a first key such as a public key and using a preset algorithm such as a signature algorithm.

In the embodiment of the present application, the validity information of the NDM file is sent to the receiving device, so that the receiving device can determine the valid period of the NDM file, thereby enhancing validity of the NDM file.

On a basis of the foregoing embodiment, the receiving device further receives a certificate and information about the preset algorithm that are sent by the sending device, where the certificate includes a second key, where the second key is used to verify the integrity information.

In addition to the integrity information and validity information of the NDM file, the sending device further sends the certificate and the information about the preset algorithm to the receiving device. The sending device may send the signature information, the validity information (Valid Period), the information about the preset algorithm, and the certificate separately to the receiving device. In the embodiment of the present application, the sending device attaches the signature information, the validity information (Valid Period), the information about the preset algorithm, and the certificate to the content of the NDM file to form a signed NDM file. The signed NDM file is as follows:

```
NDM_metadata: {
...
"authority": "org.opennetworking.fawg",
"OF_protocol_version": "1.3.3+ext187+ext235",
"type": "TTPv1",
"name": "L2-L3-ACLs",
"version": "1.0.0",
"doc": ["TTP supporting L2 (unicast, multicast, flooding), L3 (unicast only),",
"and an ACL table."]
"Valid Period": "... to ..."
"Signature": "..."
"Algorithm": "..."
"Certificate": "..."
},
```

The information about the preset algorithm corresponds to the preset algorithm used by the sending device to generate the integrity information. The certificate includes the second key used by the receiving device to perform integrity verification. After receiving the signed NDM file, the receiving device verifies, according to the signed NDM file, the signature information in the signed NDM file, and the second key in the certificate, integrity of the NDM file by using the preset algorithm. Specifically, the signed NDM file, the signature information in the signed NDM file, and the second key in the certificate serve as input information of the preset algorithm. The input information is processed according to the preset algorithm and a verification result is output. If the verification result is success, it indicates that the NDM file is not tampered with; otherwise, the NDM file is tampered with. The preset algorithm used in the embodiment of the present application is an algorithm including both a signature algorithm and a verification algorithm in the prior art. Correspondingly, that the input information is processed according to the preset algorithm and a verification result is output is also the prior art.

In addition, if the receiving device prestores the second key and the information about the preset algorithm, the signed NDM file may include only the signature information and the validity information (Valid Period). If the receiving device prestores the second key, the signed NDM file should include the signature information, the validity information (Valid Period), and the information about the preset algorithm. If the receiving device prestores the information about the preset algorithm, the signed NDM file should include the signature information, the validity information (Valid Period), and the second key. The sending device sends the second key to the receiving device by including the second key in the certificate, or sends the second key to the receiving device by directly attaching the second key to the NDM file.

In the embodiment of the present application, the sending device sends the information about the preset algorithm and the certificate to the receiving device, so that the receiving device accurately verifies whether the NDM file is tampered with.

Figure 3:
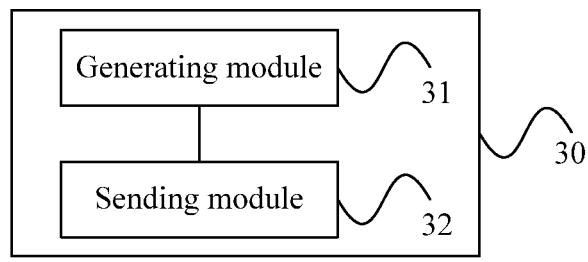
FIG. 3 is a structural diagram of a sending device according to an embodiment of the present application.

FIG. 3 is a structural diagram of a sending device according to an embodiment of the present application. The sending device provided by the embodiment of the present application may execute a processing procedure provided by an embodiment of an NDM file protection method. As shown in FIG. 3, the sending device 30 includes a generating module 31 and a sending module 32. The generating module 31 is configured to generate integrity information of an NDM file; and the sending module 32 is configured to send the NDM file and the integrity information of the NDM file to a receiving device, so that the receiving device verifies, according to the integrity information, whether the NDM file is tampered with.

In the embodiment of the present application, integrity information of an NDM file is sent to a receiving device, so that the receiving device can verify, according to the integrity information, whether the NDM file is tampered with, thereby enhancing security of the NDM file.

On a basis of the foregoing embodiment, the generating module 31 is further configured to generate validity information of the NDM file, for the receiving device to determine a valid period of the NDM file.

The generating module 31 is specifically configured to: generate signature information for the NDM file by using a first key and using a preset algorithm, where the signature information serves as the integrity information; or generate signature information for the NDM file and the validity information by using a first key and using a preset algorithm, where the signature information serves as the integrity information.

The sending module 32 is specifically configured to send a certificate and information about the preset algorithm to the receiving device, where the certificate includes a second key, where the second key is used to verify the integrity information.

The sending device provided by the embodiment of the present application may be specifically configured to execute the embodiment of the method provided in FIG. 1, and its specific function is not further described herein.

In the embodiment of the present application, the validity information of the NDM file is sent to the receiving device, so that the receiving device can determine the valid period of the NDM file, thereby enhancing validity of the NDM file; the information about the preset algorithm and the certificate are sent to the receiving device, so that the receiving device accurately verifies whether the NDM file is tampered with.

Figure 4:
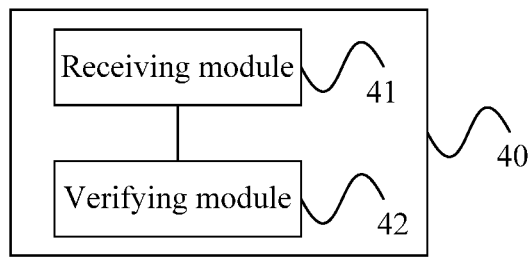
FIG. 4 is a structural diagram of a receiving device according to an embodiment of the present application.

FIG. 4 is a structural diagram of a receiving device according to an embodiment of the present application. The receiving device provided by the embodiment of the present application may execute a processing procedure provided by an embodiment of an NDM file protection method. As shown in FIG. 4, the receiving device 40 includes a receiving module 41 and a verifying module 42. The receiving module 41 is configured to receive an NDM file and integrity information of the NDM file that are sent by a sending device; and the verifying module 42 is configured to verify, according to the integrity information, whether the NDM file is tampered with.

In the embodiment of the present application, integrity information of an NDM file is sent to a receiving device, so that the receiving device can verify, according to the integrity information, whether the NDM file is tampered with, thereby enhancing security of the NDM file.

On a basis of the foregoing embodiment, the NDM file received by the receiving module 41 includes validity information, where the validity information is information of the NDM file, generated by the sending device, and used by the receiving device to determine a valid period of the NDM file.

The integrity information is signature information that is generated by the sending device for the NDM file by using a first key and using a preset algorithm; or the integrity information is signature information that is generated by the sending device for the NDM file and the validity information by using a first key and using a preset algorithm.

The receiving module 41 is further configured to receive a certificate and information about the preset algorithm that are sent by the sending device, where the certificate includes a second key, where the second key is used to verify the integrity information.

The receiving device provided by the embodiment of the present application may be specifically configured to execute the embodiment of the method provided in FIG. 2, and its specific function is not further described herein.

In the embodiment of the present application, the validity information of the NDM file is sent to the receiving device, so that the receiving device can determine the valid period of the NDM file, thereby enhancing validity of the NDM file; the information about the preset algorithm and the certificate are sent to the receiving device, so that the receiving device accurately verifies whether the NDM file is tampered with.

Figure 5:
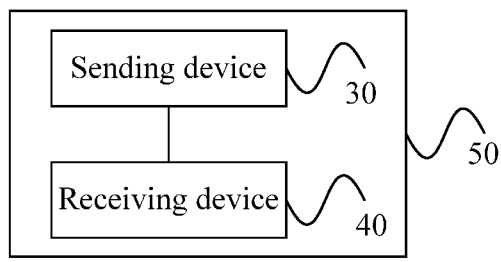
FIG. 5 is a structural diagram of an NDM file protection system according to an embodiment of the present application.

FIG. 5 is a structural diagram of an NDM file protection system according to an embodiment of the present application. The NDM file protection system provided by the embodiment of the present application may execute a processing procedure provided by an embodiment of an NDM file protection method. As shown in FIG. 5, the NDM file protection system 50 includes the sending device 30 in the foregoing embodiment and the receiving device 40 in the foregoing embodiment.

The NDM file protection system provided by the embodiment of the present application may execute a processing procedure provided by an embodiment of an NDM file protection method.

Figure 6:
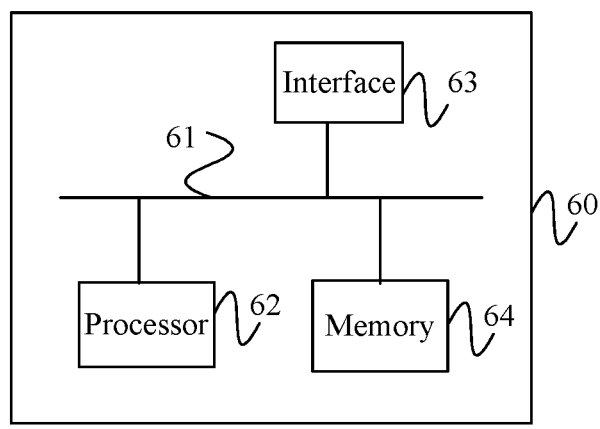
FIG. 6 is a structural diagram of hardware of a sending device according to an embodiment of the present application.

An embodiment of the present application further provides a sending device 60. As shown in FIG. 6, the sending device 60 includes a bus 61, and a processor 62, an interface 63, and a memory 64 that are connected to the bus. The memory 64 is configured to store an instruction; the processor 62 is configured to execute the instruction and generate integrity information of an NDM file; and the interface 63 is configured to send the NDM file and the integrity information of the NDM file to a receiving device, so that the receiving device verifies, according to the integrity information, whether the NDM file is tampered with.

In the embodiment of the present application, optionally, the processor 62 executes the instruction and is further configured to generate validity information of the NDM file, for the receiving device to determine a valid period of the NDM file.

In the embodiment of the present application, optionally, the processor 62 executes the instruction and is specifically configured to: generate signature information for the NDM file by using a first key and using a preset algorithm, where the signature information serves as the integrity information; or generate signature information for the NDM file and the validity information by using a first key and using a preset algorithm, where the signature information serves as the integrity information.

In the embodiment of the present application, the interface 63 is specifically configured to send a certificate and information about the preset algorithm to the receiving device, where the certificate includes a second key, where the second key is used to verify the integrity information.

In the embodiment of the present application, integrity information of an NDM file is sent to a receiving device, so that the receiving device can verify, according to the integrity information, whether the NDM file is tampered with, thereby enhancing security of the NDM file.

Figure 7:
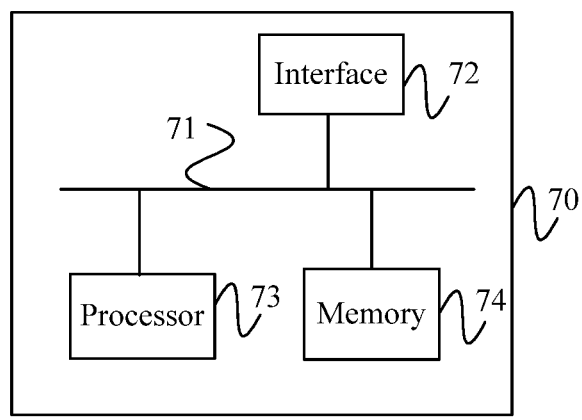
FIG. 7 is a structural diagram of hardware of a receiving device according to an embodiment of the present application.

An embodiment of the present application further provides a receiving device 70. As shown in FIG. 7, the receiving device 70 includes a bus 71, and an interface 72, a processor 73, and a memory 74 that are connected to the bus 71. The interface 72 is configured to receive an NDM file and integrity information of the NDM file that are sent by a sending device; the memory 74 is configured to store an instruction; and the processor 73 is configured to execute the instruction and verify, according to the integrity information, whether the NDM file is tampered with.

In the embodiment of the present application, optionally, the NDM file received by the interface 72 includes validity information, where the validity information is information of the NDM file, generated by the sending device, and used by the receiving device to determine a valid period of the NDM file.

In the embodiment of the present application, optionally, the integrity information received by the interface 72 is signature information that is generated by the sending device for the NDM file by using a first key and using a preset algorithm; or the integrity information is signature information that is generated by the sending device for the NDM file and the validity information by using a first key and using a preset algorithm.

In the embodiment of the present application, optionally, the interface 72 is further configured to receive a certificate and information about the preset algorithm that are sent by the sending device, where the certificate includes a second key, where the second key is used to verify the integrity information.

In the embodiment of the present application, integrity information of an NDM file is sent to a receiving device, so that the receiving device can verify, according to the integrity information, whether the NDM file is tampered with, thereby enhancing security of the NDM file.

Figure 8:
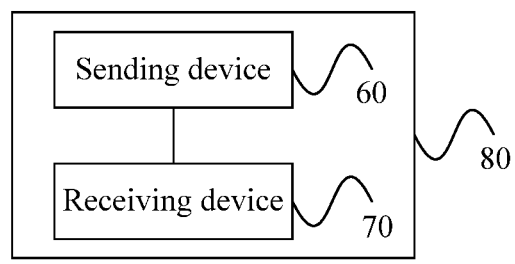
FIG. 8 is a structural diagram of hardware of an NDM file protection system according to an embodiment of the present application.

An embodiment of the present application further provides an NDM file protection system 80. As shown in FIG. 8, the NDM file protection system 80 includes the sending device 60 in the foregoing embodiment and the receiving device 70 in the foregoing embodiment.

The NDM file protection system provided by the embodiment of the present application may execute a processing procedure provided by an embodiment of an NDM file protection method.

In summary, in the embodiments of the present application, a sending device sends integrity information of an NDM file to a receiving device, so that the receiving device can verify, according to the integrity information, whether the NDM file is tampered with, thereby enhancing security of the NDM file. The sending device sends validity information of the NDM file to the receiving device, so that the receiving device can determine a valid period of the NDM file, thereby enhancing validity of the NDM file. The sending device sends information about a preset algorithm and a certificate to the receiving device, so that the receiving device accurately verifies whether the NDM file is tampered with.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the Blocks of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:
1. A method, comprising:
generating, by a sending device, integrity information of a negotiable datapath model (NDM) file, wherein gen- erating the integrity information comprises generating signature information for the NDM file and validity information for the NDM file using a first key and using a preset algorithm, wherein the signature information serves as the integrity information, and wherein the validity information comprises a valid period of the NDM file;

adding the integrity information and the validity information to a metadata section of the NDM file; and sending, by the sending device, the NDM file with the integrity information of the NDM file to a receiving device, causing the receiving device to verify, according to the integrity information, whether the NDM file has been tampered with.

2. The method according to claim 1, further comprising: generating, by the sending device, the validity information of the NDM file for the receiving device to determine the valid period of the NDM file.

3. The method according to claim 1, further comprising: sending, by the sending device, a certificate and information of the preset algorithm to the receiving device, wherein the certificate comprises a second key, wherein the second key is used to verify the integrity information.

4. A method, comprising:
receiving, by a receiving device, a negotiable datapath model (NDM) file that is sent by a sending device;
after receiving the NDM file, retrieving integrity information of the NDM file from a metadata section of the NDM file;
retrieving validity information of the NDM file from the metadata section and determining a valid period of the NDM file according to the validity information; and
verifying, by the receiving device, whether the NDM file has been tampered with according to the integrity information.

5. The method according to claim 4, wherein the validity information is generated by the sending device.

6. The method according to claim 5, wherein the integrity information is signature information that is generated by the sending device for the NDM file and the validity information using a first key and using a preset algorithm.

7. The method according to claim 5, further comprising: receiving, by the receiving device, information of the preset algorithm and a certificate that are sent by the sending device, wherein the certificate comprises a second key, wherein the second key is used to verify the integrity information.

8. A sending device, comprising:
a processor; and
a non-transitory computer-readable storage medium storing a program to be executed by the processor, the program including instructions for:
generating integrity information and validity information of a negotiable datapath model (NDM) file;
adding the integrity information and the validity information to a metadata section of the NDM file; and
generating a signed NDM file from the NDM file and the integrity information, wherein the metadata section of the signed NDM file comprises protocol version information of the NDM file, a valid period of the NDM file, and the integrity information of the NDM file; and
a transmitter, configured to send the signed NDM file to a receiving device, causing the receiving device to verify, according to the integrity information, whether the NDM file has been tampered with.

9. The sending device according to claim 8, wherein the program further includes instructions for:
generating signature information for the NDM file and the validity information using a first key and using a preset algorithm, wherein the signature information serves as the integrity information.

10. The sending device according to claim 9, wherein the transmitter is further configured to send a certificate and information of the preset algorithm to the receiving device, wherein the certificate comprises a second key, wherein the second key is used to verify the integrity information.

11. A receiving device, comprising:
a receiver, configured to:
receive a negotiable datapath model (NDM) file from a sending device;
after receiving the NDM file, retrieve integrity information of the NDM file from a metadata section of the NDM file; and
retrieve validity information of the NDM file from the metadata section;
a processor; and
a non-transitory computer-readable storage medium storing a program to be executed by the processor, the program including instructions for:
determine a valid period of the NDM file according to the validity information; and
verifying, according to the integrity information, whether the NDM file has been tampered with.

12. The receiving device according to claim 11, wherein the validity information is generated by the sending device.

13. The receiving device according to claim 12, wherein the integrity information is signature information that is generated by the sending device for the NDM file and the validity information by using a first key and using a preset algorithm.

14. The receiving device according to claim 13, wherein the receiving device is further configured to receive a certificate and information of the preset algorithm that are sent by the sending device, wherein the certificate comprises a second key, wherein the second key is used to verify the integrity information.

15. A system, comprising:
a sending device; and
a receiving device;
wherein the sending device comprises a processor and a non-transitory computer readable storage medium storing instructions, and the processor is configured to execute the instructions to:
generate an integrity information and validity information of a negotiable datapath model (NDM) file;
add the integrity information and the validity information to a metadata section of the NDM file;
generate a signed NDM file from the NDM file and the integrity information, wherein the metadata section of the signed NDM file comprises protocol version information of the NDM file, a valid period of the NDM file, and the integrity information of the NDM file; and
send the signed NDM file to the receiving device; and
wherein the receiving device is configured to receive the signed NDM file sent by the sending device, and verify, according to the integrity information, whether the NDM file has been tampered with.

16. The system according to claim 15, wherein the processor is further configured to execute the instructions to:

generate signature information for the NDM file using a first key and using a preset algorithm, wherein the signature information serves as the integrity information.

\* \* \* \* \*